UNITED STATES PATENT OFFICE.

ARTHUR T. MALM, OF WORCESTER, MASSACHUSETTS, ASSIGNOR TO NORTON COMPANY, OF WORCESTER, MASSACHUSETTS, A CORPORATION OF MASSACHUSETTS.

HOLLOW ARTICLE OF REFRACTORY MATERIAL.

1,152,428. Specification of Letters Patent. Patented Sept. 7, 1915.

No Drawing. Application filed October 4, 1912. Serial No. 723,865.

*To all whom it may concern:*

Be it known that I, ARTHUR T. MALM, a citizen of the United States, residing at Worcester, in the county of Worcester and State of Massachusetts, have invented certain new and useful Improvements in Hollow Articles of Refractory Material, of which the following is a specification.

This invention relates to hollow articles of refractory material, such as pyrometer tubes, combustion tubes and the like, the object of the invention being the provision of articles which are at the same time impervious to gases and capable of enduring extremely high temperatures.

The invention will be described as embodied in a pyrometer tube, but is applicable to other articles.

Pyrometer tubes are essentially protecting media for thermo-couples, excluding injurious gases therefrom. They are commonly made of porcelain, which material is however unsatisfactory in certain respects; in particular, porcelain tubes are not refractory in the now-accepted sense of this term, inasmuch as they bend at temperatures as low as 1350° C.; being glazed, they are apt to adhere at high temperatures to the external support, or to any other material with which it may come in contact; they are easily broken or cracked when subjected to sudden temperature changes; and they possess a low heat-conductivity, thus introducing a lag into the heat measurement.

Tubes made of previously molten alumina, crushed, graded and suitably bonded, present none of the above defects, being extremely refractory, free from tendency to adhere at high temperatures to contacting refractory surfaces, able to withstand sudden temperature changes without injury, and possessing a thermo-conductivity so high that temperature readings may be made without material lag. Unglazed alumina tubes are however too porous to afford sufficient protection to the thermo-couple and if the tubes are glazed they are liable to flux and adhere as is the case with porcelain tubes. According to the present invention, this objection is overcome by providing a pyrometer tube, or other hollow article, having an interior non-porous body, with a surface coating or coatings of highly refractory, unglazed and therefore porous material, usually previously molten alumina, this material being non-glazing. For pyrometer tubes it is advisable to apply the unglazed coating both to the inside and outside of the glazed tube, but for other purposes a single non-glazing coating may suffice this coating being usually external in order to avoid adherence of the highly heated tube to its refractory support.

A suitable porous composition for application to the surface or surfaces of the previously-formed and glazed tube or other article may comprise previously molten alumina, crushed and graded, and mixed with a small proportion of clay or other suitable ceramic bond. This coating is preferably applied wet, dried and fired according to the well known method.

A glazed hollow article suitable for the application of the unglazed coating may be prepared in the manner described in my Patent No. 1,081,542, dated December 16, 1913.

I claim:—

1. A hollow article made of a highly refractory non-glazing material and a glazing composition, and having a non-glazing coating applied thereto.

2. A hollow article comprising a highly refractory non-glazing body rendered impervious by a glazing composition, and having a non-glazing coating applied thereto.

3. A hollow article comprising a highly refractory non-glazing body rendered impervious by a glazing composition and non-glazing exterior and interior coatings applied thereto.

4. A hollow article comprising a body portion containing previously molten alumina rendered impervious by glazing, and a non-glazing highly refractory coating applied to said body portion.

5. A hollow article comprising a body portion containing previously molten alumina rendered impervious by glazing, and non-glazing highly refractory exterior and interior coatings applied to said body portion.

6. A hollow article comprising a body portion containing previously molten alumina rendered impervious by glazing, and a non-glazing highly refractory coating containing previously molten alumina applied to said body portion.

7. A hollow article comprising a body portion containing previously molten alumina rendered impervious by glazing, and non-glazing highly refractory exterior and interior coatings containing previously molten alumina applied to said body portion.

In testimony whereof I affix my signature in presence of two witnesses.

ARTHUR T. MALM.

Witnesses:
 ALDUS C. HIGGINS,
 ROSS C. PURDY.

Copies of this patent may be obtained for five cents each, by addressing the "Commissioner of Patents, Washington, D. C."

It is hereby certified that in Letters Patent No. 1,152,428, granted September 7, 1915, upon the application of Arthur T. Malm, of Worcester, Massachusetts, for an improvement in "Hollow Articles of Refractory Material," an error appears in the printed specification requiring correction as follows: Page 1, line 57, for the word "unglazed" read *non-glazing;* and that the said Letters Patent should be read with this correction therein that the same may conform to the record of the case in the Patent Office.

Signed and sealed this 2nd day of November, A. D., 1915.

[SEAL.]

R. F. WHITEHEAD,
*Acting Commissioner of Patents.*